April 25, 1950      M. L. FRUMKIN      2,505,037

BOTTLE WITH TEMPERATURE INDICATOR

Filed Jan. 8, 1948

MORRIS L. FRUMKIN
INVENTOR

BY Herbert J. Brown
ATTORNEY

Patented Apr. 25, 1950

2,505,037

UNITED STATES PATENT OFFICE 2,505,037

BOTTLE WITH TEMPERATURE INDICATOR

Morris L. Frumkin, Nashville, Tenn.

Application January 8, 1948, Serial No. 1,245

1 Claim. (Cl. 73—343)

This invention relates to nursing bottles and has reference to bottles having thermometers on or in their surfaces for indicating the temperature of the liquid therein.

Heretofore thermometers have been secured to bottles in various ways, but such previous arrangements did not readily lend themselves to sterilizing the bottle after use since they were made with corners, crevices, and other parts not easily reached for cleaning.

It is therefore an object of this invention to provide an arrangement of a bottle and a thermometer secured thereon whereby the parts of the assembly may be readily cleaned and sterilized.

It is an object of one form of the invention herein shown to provide spring clip means for holding the referred to thermometer in place and thus allowing the thermometer to be readily attached and detached from the bottle for cleaning and sterilizing.

These and other objects will become apparent from the following description of the accompanying drawing, wherein.

In all forms of the invention, the bottle 1 is provided with a longitudinal recess or depression 2 in the outer surface thereof, and which depression is relatively shallow and without sharp corners whereby the same may be cleaned or sterilized.

Figure 1:
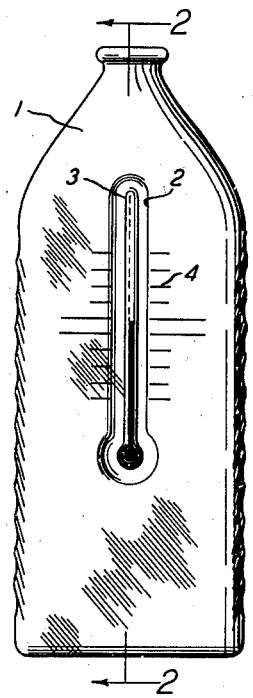
Figure 1 is a front elevational view of a bottle embodying one form of my invention.
Figure 2:
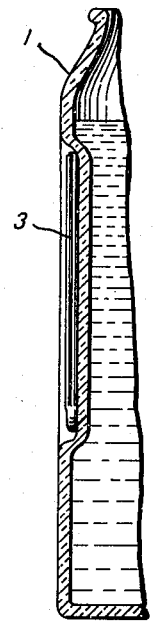
Figure 2 is a broken vertical sectional view taken on lines 2—2 of Figure 1.
Figure 3:
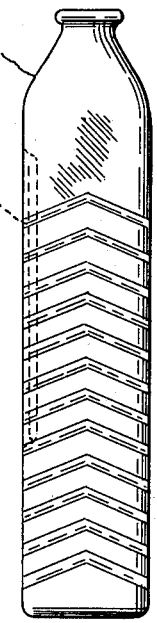
Figure 3 is a side elevational view of Figure 1.

Received within the depression 2 there is a thermometer 3, the graduations 4 for which are formed in or otherwise indicated on the surface of the bottle 1, as shown in Figure 1.

Figure 5:
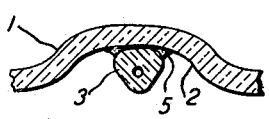
Figure 5 is a view similar to Figure 4 and illustrates a thermometer cemented in place, also shown in Figures 1 and 2.

As particularly shown in Figure 5, the thermometer 3 may be secured within the shallow recess 2 by cement 5, and which cement, as applied, is without corners along the outer surface where the edges of the same touch the thermometer 3 and the surface of the depression 2.

Figure 4:
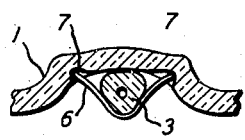
Figure 4 is a transverse sectional view of a portion of a bottle and showing a metal spring clip arrangement for detachably retaining the thermometer in place.
Figure 6:
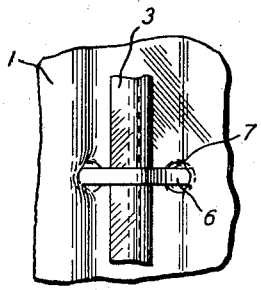
Figure 6 is a broken front elevational view of a bottle and showing the front view of a clip, shown in Figure 4, for retaining the thermometer within the recess in the said bottle.

Referring now to Figures 4 and 6, the thermometer 3 may be held in place by means of bowed spring clips 6, the ends of which are received within small depressions or secured dots 7 formed in or near the bottom of the depression 2 and in opposite sides of the said depression. Thus, the thermometer 3 may be readily removed from the bottle 1 by removing the clips 7, which are preferably in pairs, one of which is located near the top or upper end of the depression 2 and the other near the bottom. After cleaning and sterilizing, the thermometer may again be placed in the depression 2 and secured by engaging the ends of the springs 6 in the recesses or dots 7.

The described form of the invention is not restrictive but may be made in many ways within the scope of the appended claim.

What is claimed is:

A bottle having a longitudinal depression in the surface thereof, a thermometer received within said depression, and spring clips laterally positioned over and against said thermometer and having their ends engaged against opposing sides of said depression.

MORRIS L. FRUMKIN.

REFERENCES CITED

The following references are of record in the file of this patent:

FOREIGN PATENTS

| Number | Country | Date |
|---|---|---|
| 11,320 | Great Britain | Aug. 19, 1887 |